Figure 3:
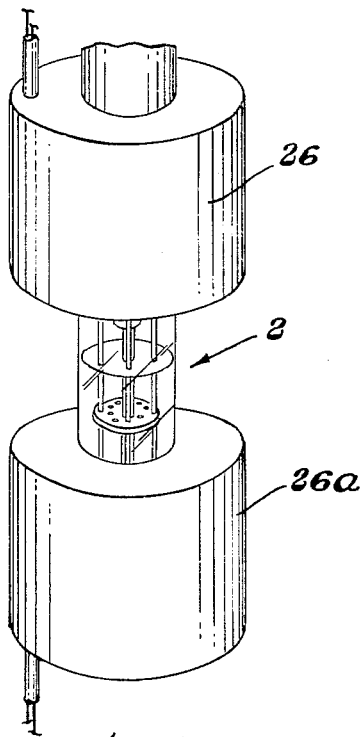

Sept. 14, 1965
R. A. GASKA ETAL
3,206,172
APPARATUS FOR USE IN PROCEDURES REQUIRING
AGITATION IN A CLOSED SYSTEM
Filed Aug. 5, 1963
2 Sheets-Sheet 1
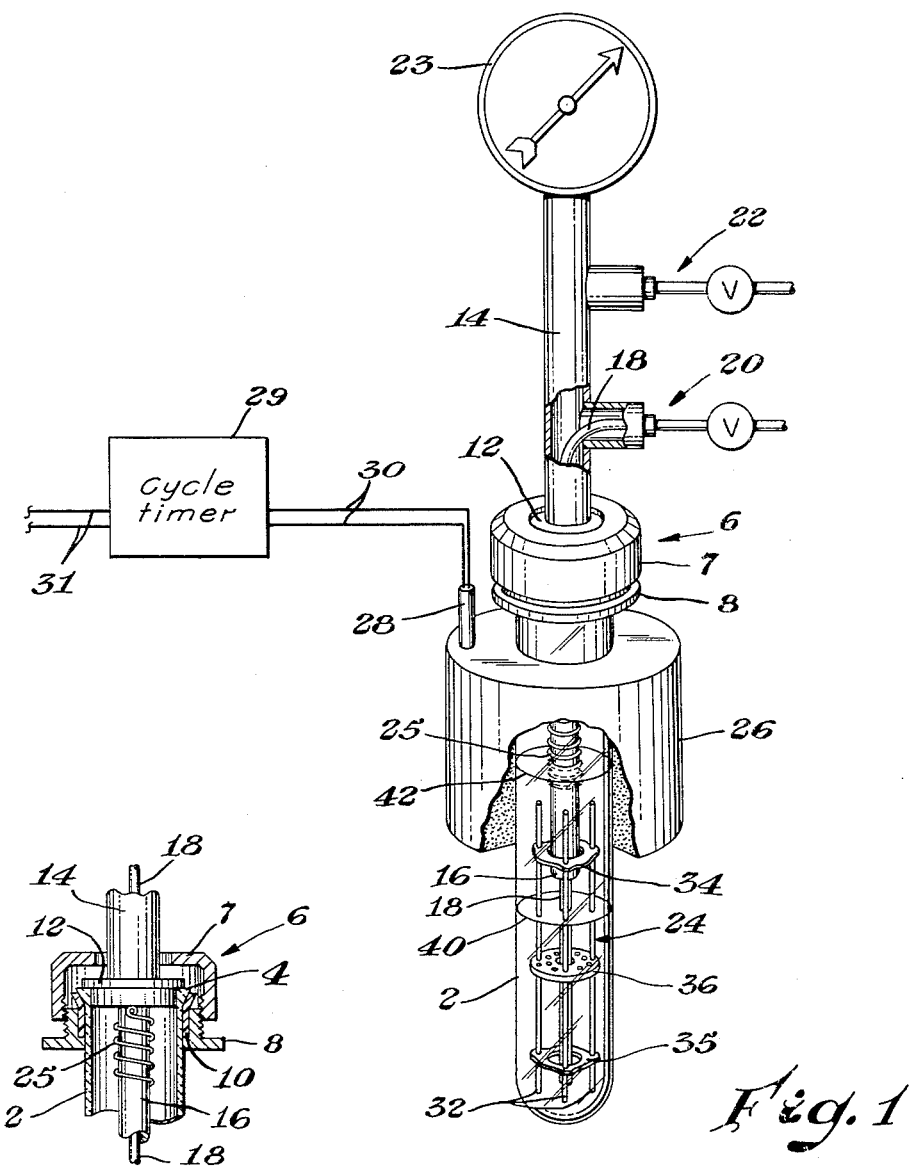
INVENTORS.
Remigius A. Gaska
Harold A. Brejcha
BY
ATTORNEY Sept. 14, 1965  R. A. GASKA ETAL  3,206,172
APPARATUS FOR USE IN PROCEDURES REQUIRING
AGITATION IN A CLOSED SYSTEM
Filed Aug. 5, 1963  2 Sheets-Sheet 2

INVENTORS.
Remigius A. Gaska
Harold A. Brejcha
BY C.U.Carlin

ATTORNEY

United States Patent Office 3,206,172
Patented Sept. 14, 1965

3,206,172
APPARATUS FOR USE IN PROCEDURES REQUIRING AGITATION IN A CLOSED SYSTEM
Remigius A. Gaska and Harold A. Brejcha, Midland, Mich., assignors to The Dow Chemical Company, Midland, Mich., a corporation of Delaware
Filed Aug. 5, 1963, Ser. No. 299,914
13 Claims. (Cl. 259—27)

The invention is an improved apparatus adaptable to laboratory, pilot plant, and large scale industrial operations wherein immiscible liquids are required to be intermixed.

Adequate and controlled mixing of immiscible liquids is an important stage or accompanying condition forming a part of many procedures. Satisfactory mixing of such liquids presents a number of problems, e.g., wherein mixing must be intermittent and very often substantially automatically timed, wherein mixing must be carried out in a closed system as when conducted at greater or less than atmospheric pressure, wherein mixing of one or more reactants including gaseous reactants must be more-or-less continuously provided, and wherein products formed must be removed while mixing continues.

A chemical procedure falling under the above conditions and requiring agitation is that of organic extraction of certain substances from one liquid by another liquid in admixture therewith wherein the liquids are substantially immiscible. The substance sought to be extracted may be contaminant to be removed or it may be a desirable one to be separated and recovered. In such extraction, the liquids tend to stratify and do stratify when mixing is inadequate or ceases.

Extractions are conventionally carried out either in a separatory funnel-type apparatus wherein the two immiscible phases are mixed, are then allowed to stratify, and are subsequently successively drawn off or in a mixer-settler type of apparatus. Both of these apparatus are difficult to adapt for use in a closed system wherein the pressure is different from that of the atmosphere. Many extraction processes require agitation which provides a time lag or relaxation period following each passage of the stirring paddle blade or plate through the liquids, for the purpose of permitting droplets of one liquid, carried by the paddle blade or plate into the other liquid to coalesce and tend to return to the phase of like liquid. It has been shown that the rate and completeness of extraction is definitely improved when such agitation is provided. A number of extraction processes require the admission of a reactant which is a gas at the temperature of the reactions, e.g., HCl or $NH_3$.

A need exists for an apparatus which provides adequate stirring of immiscible liquids and is particularly adaptable for use in solvent extraction processes.

We have invented a vertically reciprocating stirring device, particularly adapted for use in mixing immiscible liquids during solvent extraction, in which a magnetically actuated reciprocating stirrer repeatedly moves upwardly through a substantial portion of the body of immiscible liquids comprising both phases and alternately drops back again through the phases, thereby effecting intimate contact of the immiscible liquids, with or without also the admixture of a gas, into the mixing chamber without stratification.

The invention enables one to carry out extractions in a closed system, to observe the process visually (if desired) to sample the liquid phases while they are still under the reduced or higher pressure employed in the process. The reaction vessel or extraction vessel of the apparatus may be (if desired) maintained at constant temperatures as by being immersed in a constant temperature bath during the operation.

The design and the arrangement and functioning of parts comprising the apparatus of the invention will be made clear in the ensuing description and illustrative example, when read with reference to the annexed drawing.

The drawing shows one embodiment of the apparatus especially suitable for extraction of a substance present in one liquid which is in intimate contact with another liquid that is immiscible with the first liquid and in which said substance is soluble, whereby at least a portion of said substance is extracted from the first liquid by the second. Where the solubility of the substance sought to be extracted is not great in the extractant liquid, the extraction procedure must be repeated employing fresh extractant until a sufficient amount of the substance has been extracted.

It is to be noted that the drawing is for purposes of illustrating a preferred embodiment of the invention and is not to be construed as limiting the apparatus beyond that defined in the appended claims. For example, a wire mesh envelope may advantageously be provided for any breakable parts of the apparatus as a safety precaution. The materials, proportions and dimensions, may be varied with the scope and spirit of the invention.

FIGURE 1 of the drawing shows an assembled mixing apparatus of the invention, with parts broken away to show structure. FIGURE 2 shows a portion of the apparatus of FIGURE 1, with parts removed to show structure, wherein certain items of structure are shown loosely assembled for purposes of illustration.

Figure 4:
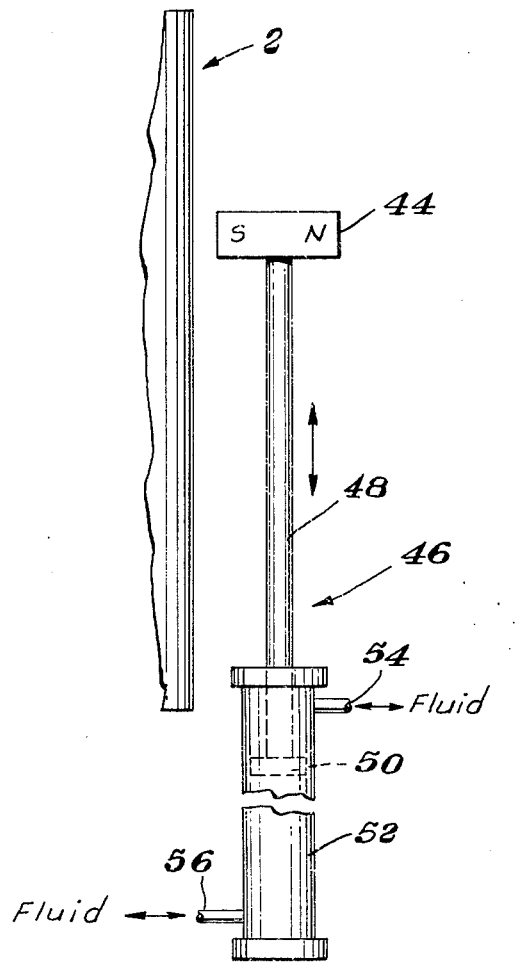

FIGURE 3 of the drawing shows a modification of a portion of FIGURE 1, with parts removed, wherein two electromagnets are employed. FIGURE 4 is a fragmentary side elevation which shows a further modification of a portion of FIGURE 1 wherein a reciprocating permanent magnet is employed instead of an electromagnet.

In the drawing, vessel 2 (of the nature of an enlarged laboratory test tube) of appropriate size and of suitably sturdy material, preferably transparent and provided with flange 4 at the upper and open end thereof, is held in position by union 6 composed of female member 7 and male member 8 which, when threadingly engaged, and preferably provided with nylon or Teflon (polytetrafluoroethylene) gasket 10 positioned between flange 4 of vessel 2 and union member 8, thereby enabling the union members to hold vessel 2 in place by male union member 8 firmly clasping flange 4 and pressing it tightly against gasket 10 which makes sealing engagement with male member 8 and (as the members of the union are tightened) drawing flange 4 firmly against closure cap 12 which is composed of a shoulder portion and a plug portion for sealing off or providing entry as desired into the opening of vessel 2. Cap 12 is immovable fixed on pipe 14. Extending downwardly from and forming a part of pipe 14 is pipe 16. Inside of pipe 16 is pipe 18, of smaller diameter and parallel thereto, pipes 16 and 18 thereby forming two concentric open-end pipes. Flow control assembly 20, provided with a valve as indicated, is connected to inner concentric pipe 18 which extends to a point near the bottom of vessel 2. Flow control assembly 22, provided with a valve as indicated, is connected, by T arrangement, to pipe 14 that is continuous with pipe 16 which extends to a level which is intermediate the bottom and the top of vessel 2. Secured to the top of pipe 14 is pressure gauge 23. Slidably positioned inside of vessel 2, having provision for concentric pipes 16 and 18 to pass centrally and vertically therethrough, is a stirring assembly, referred to generally as item 24, which is discussed in more detail in the second paragraph below. Positioned about the upper part of outer concentric pipe 16, having the upper portion thereof secured thereto, is optional coil spring 25.

Positioned about the upper portion of vessel 2 is electromagnet 26 provided with a liquid-tight electric terminal 28 extending upwardly therefrom. Leading from the terminal to cycle timer 29 are electrical wires 30. Leading from timer 29 to a source of electric current are electric wires 31. The position of stirring assembly 24 when at rest relative to electromagnet 26 is such as to insure high efficiency. It has been found that more economical operation and greater efficiency result when stirring assembly 24 is positioned, when at rest substantially as shown in the drawing, i.e., the upper limit extending a short distance into the zone of vessel 2 which is circumferentially enclosed by the magnet.

In more detail, stirring assembly 24 comprises three substantially vertically soft iron rods 32, each preferably individually protected against corrosion by a resinous surface coating, e.g., of nylon or Teflon, and two spaced-apart more-or-less circular (but not necessarily identical) horizontally positioned upper and lower guide members 34 and 35 respectively. Positioned between guide members 34 and 35 is baffle plate 36 which creates turbulence and mixing in the interfacial zone of immiscible liquids in vessel 2. Soft iron rods 32 pass through holes provided therefor in each of the guide members and plate 36, thereby substantially equally spacing rods 32 in a circular pattern about 120° apart. Circular plate 36 forms sliding engagement with the inner wall of vessel 2 but preferably allows only small clearance therewith. The guide members and plate 36 are usually of a corrosion resistant material. Guide members 34 and 35 and plate 36 are provided with central openings. Both concentric pipes 16 and 18 pass through the central opening of upper guide member 34, outer concentric pipe 16 terminating just below that guide member when stirring assembly 24 is at rest, i.e., in the lower portion of vessel 2. Inner concentric pipe 18 (shortly after emerging from outer pipe 16) extends down and through the central opening in each of circular plate 36 and lower guide member 35 when agitator assembly 24 is at rest. Circular plate 36 is provided with a plurality of holes distributed about the annulus portion thereof for the purpose of allowing liquids to pass therethrough as small streams or droplets as the agitator assembly moves up and down through a liquid in vessel 2. There should be at least two holes in circular plate 36, in addition to those through which iron rods 32 pass, and preferably there should be between about 6 and 20. About 10 to 30 holes per square inch of annular area of the plate is recommended. The size of the holes collectively must be such that an appreciable amount of liquid passes therethrough as the plate moves up or down through a liquid but not all the liquid to effect thereby, the desired agitation and intimate mixing. The holes may be of any common shape, but usually substantially circular holes of between about $1/32$ inch diameter and more often between about $1/16$ inch and $1/8$ inch are provided.

Obvious variations of the apparatus of the invention are contemplated as falling within the scope thereof. For example, coil spring 25 need not be employed, but the stirring assembly allowed to return to its lower position by gravity only. A further modification consists of advantageously locating a second electromagnet at the lower part of vessel 2, as illustrated by item 26A of FIGURE 3. Electromagnet 26A operates alternately with electromagnet 26, thereby aiding the pull of gravity and supplementing or replacing spring 25 for returning stirring assembly 24 to its lower position. A still further modification when two magnets are employed, each positioned near the end of vessel 2 is to place vessel 2 in a horizontal position since gravity does not then play an essential part in the reciprocating motion of the stirring assembly.

If preferred, the fixed electromagnet may be replaced by a movable permanent magnet which is reciprocated vertically, outside of vessel 2, by an appropriate means, e.g., a connecting rod-crank assembly connected to a suitable power source. Illustrative of a movable permanent magnet arrangement is that shown in FIGURE 4 wherein rod 48, having one end attached to permanent magnet 44 and the other attached to piston 50, is caused to reciprocate in chest 52 by alternately injecting and ejecting fluid (e.g. water, air, or steam) into and out of flow-controlled vents 54 and 56.

The apparatus provides vertically moving reciprocating agitation (which is exceptionally well suited for agitating immiscible liquids, which inherently tend to stratify, in a closed system) in vessel 2 by the magnetic effect intermittently induced by the electric current supplied to electromagnet 26. The thus actuated electromagnet attracts the soft iron rods 32 of agitator assembly 24, drawing it upwardly, compressing coil spring 25, when employed, by guide 34. When the flow of electricity through electromagnet 24 intermittently ceases (as controlled by cycle timer 29) agitator assembly 24 falls, due to gravity (or by tension in spring 25, when employed, due to its compression), to the bottom of vessel 2. As the electric current alternately flows and ceases to flow, the agitator moves up and down in rhythm with the flow of electricity in the electromagnet. Thus, by the up and down passes made by the agitator, any liquids contained in vessel 2 are agitated as a result. As aforesaid, best results are obtained when a relaxation or period of suspended action is provided at the end of each stroke.

To use the apparatus of the invention, union 6 may be conveniently disassembled and the immiscible liquids, requiring agitation, are placed in vessel 2. Union 6 is then tightened so that flange 4 of vessel 2 is tightly engaged with upper member 7 of union 6. However, the apparatus may be employed by having it already assembled and introducing the immiscible liquids through either of the openings in flow control assemblies 20 or 22 or by introducing one liquid through 20 and another through 22. The immiscible liquids are employed in amounts of each to provide, when unagitated, an interface, as represented by numeral 40 in the drawing, so that plate 36 will pass therethrough when the apparatus is in operation, and an upper surface as represented by numeral 42 in the drawing. If a gas or a third liquid is to be employed in the procedure, it may also be introduced through either 20 or 22 or both. When constant temperature is desirable, vessel 2 as well as electromagnet 26, may be immersed in a constant temperature bath, terminal 28 insuring electric contact without wetting the lead wires. Electric current is introduced through wires 31 and 30 to actuate the electromagnet. The cycle timer 29 is adjusted to the desired on and off time intervals. When the electromagnet is actuated, the stirring assembly comprising the soft iron rods is pulled upwardly through the liquids in vessel 2 and when the flow of current is broken, the stirring assembly drops back through the liquids (as aforesaid) thereby creating agitation, providing intimate contact between the liquids, and preventing stratification.

The relative length of time during which the electricity is on and off depends upon a number of factors such as the viscosity of the liquids, the volume of the liquids, the density of the liquids, and their tendency to stratify. As illustrative, convenient times to employ in mixtures of an aqueous salt solution and a common organic solvent, which is immiscible therewith, are from about 0.5 to 3 seconds on, during which the stirring assembly 24 moves upwardly (and may remain suspended) and between about 0.2 and 1 second during which the stirring assembly 24 descends through the liquids and may remain at rest). The two immiscible liquids are employed in amounts sufficient to form interface 40, when unagitated, between the upper guide member 34 and circular plate 36. The intermediate circular plate 36 is adjustable and is located at a height dictated by the relative amounts of the two liquids. The interfacial zone is broken and dispersed during each upward and downward trip of the assembly.

The cycle timer is usually adjusted to provide on and off times of suitable duration to provide a state of equilibrium between the two immiscible liquids in vessel 2. During the mixing operation or after equilibrium has been reached, it is commonly desirable to sample each of the immiscible liquids. This may be readily done when employing the apparatus of the invention, if some pressure above atmospheric is employed. In such instance, the electric current is temporarily stopped and the lower stratum or phase is sampled through control assembly 20 and the upper stratum is sampled through assembly 22. If the system is being operated at atmospheric pressure or less, increased pressure, adequate for sampling through assemblies 20 and 22, can be provided by introducing an inert gas preferably through assembly 22.

When vessel 2 is made of a transparent material, e.g., glass or a suitable plastic, the entire mixing procedure can be readily observed and indicated adjustment of the stirring cycle made. (A protective wire mesh envelope secured over vessel 2 is recommended when glass is employed.) When a gas is being introduced into vessel 2, the pressure of the system will register on gauge 19 and may be adjusted within the limits dictated by safety and the attainment of the desired objectives.

The following example is illustrative of the use of the invention as illustrated in the drawing except coil spring 25 was not employed. In the example, a salt present in an aqueous solution is extracted therefrom by an organic liquid in contact therewith. An aqueous solution or brine which consisted, by weight, of 39.2% CaCl$_2$, 2.88% KCl, 0.63% NaCl, 0.09% LiCl, and balance substantially water and trace amounts of other soluble halide salts, was put in vessel 2. N-butanol was also put in vessel 2, in a ratio by volume of about 2 of the n-butanol to 1 of the salt solutions so that the interface of the two liquids lay in the path of the intermittent guide member of stirring assembly 24 and passed therethrough. Ammonia gas was introduced through assembly 20 and passed downwardly through pipe 18 into the aqueous salt solution constituting the lower phase in vessel 2. Vessel 2 and electromagnet 26 were immersed in a constant temperature bath at 25° C. Electromagnet 26 was actuated by supplying electric current to cycle timer 29 and adjusting the timer so that the current was on about 0.85 of a second and off about 0.6 second. The stirring assembly moved up and down accordingly. The ammonia was continued to be admitted through pipe 18 in an amount sufficient to provide 25% by weight thereof based on the combined weights of the aqueous solution and n-butanol.

Stirring was continued in accordance with the cycle above stated for a period of 90 minutes. At the end of that time, samples were taken by means of assemblies 20 and 22. The sample taken from 20 showed the percentages of lithium and calcium in the lower or aqueous solution and the sample taken from 22 showed the percentages of lithium and calcium in the upper or n-butanol layer. Analysis of the samples showed the following results:

|  | Aqueous Layer Grams per Liter | n-Butanol Layer Grams per Liter |
| --- | --- | --- |
| Calcium | 242.0 | 1.61 |
| Lithium | 0.161 | 0.0172 |

The above example shows that the n-butanol layer has a pronounced affinity for the lithium in the brine in the presence of ammonia and extracts lithium preferentially to the calcium when the ammonia gas is provided and intimate contact between the two liquids is maintained by the apparatus of the invention. A number of samples could have been taken prior to the final sample, if desired. In many extraction operations, the extraction procedure can advantageously be repeated a number of times, using additional extractant as by removing the spent extractant and adding fresh by means of the convenience afforded by the apparatus of the invention.

The example is illustrative of but one process for which the apparatus of the invention is useful. For example, the use of ammonia for the purpose of carrying out the removal of sulfur-containing compounds from crude petroleum can be advantageously carried out using the apparatus of the invention.

Having described our invention what we claim and desire to protect by Letters Patent is:

1. The apparatus which provides controlled continuous vertically reciprocating agitation in a liquid mixture that tends to stratify comprising: a vertically elongated vessel; an elongated vertically reciprocating agitator positioned therein having upper and lower ends and at least one vertically moving horizontal baffle plate which is positioned intermediate the upper and lower ends of the agitator and which has a central opening therein defining an annulus about the opening and a plurality of vertical soft iron rods passing through and being secured in substantially equi-spaced apart relationship in the annulus provided by said opening in the baffle plate, the rods thereby being so spaced as to describe a circular pattern in the plate and a plurality of holes distributed in the annulus of the plate through which liquid passes when the plate is moved through a body of liquid contained in said vessel; two substantially vertical concentric pipes having open lower ends, centrally positioned in said vessel, the innermost of said concentric pipes extending through the central hole in said baffle, the lower end of the outermost of said concentric pipes terminating shortly above said baffle, and the lower end of the intermost of said concentric pipes extending to a point intermediate the termination point of the lower end of said outer pipe and the bottom of said vessel, said pipes extending upwardly through an opening in the top of said vessel and in manually-controlled independent communication with exterior conduits, whereby fluids may be desirably introduced and drawn from said vessel; and magnetic means positioned exterior to said vessel and adapted to vertically reciprocate the agitator assembly by magnetically attracting the soft iron rods.

2. The apparatus of claim 1 wherein said magnetic means is a fixed electromagnet which encloses circumferentially the upper portion of said vessel.

3. The apparatus of claim 1 wherein said horizontal baffle is a substantially chemically inert resinous material.

4. The apparatus of claim 1 wherein said soft iron rods are coated with a substantially chemically inert resinous material.

5. The apparatus of claim 1 wherein said soft iron rods are held in substantially equi-spaced position by at least two guide members at least one positioned above and at least one below said baffle plate and provided with central openings therein, the opening in the guide plate above the baffle plate of a size to accommodate both of said concentric pipes in sliding engagement with the outer pipe and the guide plate below said baffle of a size to accommodate only said inner concentric pipe in sliding engagement.

6. The apparatus of claim 1 wherein said horizontal baffle contains between 10 and 30 holes per square inch of area in the annulus thereof which are of such size collectively, that when said baffle is moved through a body of liquid contained in vessel 2, some but not all the liquid through which the baffle moves will pass through said holes.

7. The apparatus of claim 6 wherein said holes in said baffle are substantially circular holes of a diameter between 1/32 inch and 1/8 inch.

8. The apparatus of claim 6 wherein said baffle is adjustable to be positioned so that it moves, when the magnetic means is engaged, vertically through a zone defined by an interface of immiscible liquids placed in said vessel.

9. The apparatus of claim 6 wherein a pressure gauge is positioned in the outer of said concentric pipes.

10. The apparatus of claim 1 wherein said magnetic means comprises a fixed electromagnet near the upper end of said vertically elongated vessel.

11. The apparatus of claim 1 wherein said magnetic means comprises a plurality of fixed electromagnets, at least one of which is positioned near the upper end and at least one other positioned near the lower end of said vertically elongated vessel.

12. The apparatus of claim 1 wherein said magnetic means comprises a movable permanent magnet which is located in a vertically sliding position and operably connected to a reciprocating means.

13. The apparatus of claim 1 wherein a coil spring is positioned about said outermost concentric pipe in the upper part of said vertical vessel, whereby the coil is compressed by said agitator at the end of its upward motion and actuates the downward motion of the agitator.

References Cited by the Examiner

UNITED STATES PATENTS

| 2,631,091 | 3/53 | Kuentzel et al. | 259—113 X |
| 2,661,938 | 12/53 | Kuentzel | 259—113 X |
| 2,784,150 | 3/57 | Rose et al. | 259—113 X |
| 2,892,620 | 6/59 | Johnson | 259—113 |

CHARLES A. WILLMUTH, *Primary Examiner.*